March 18, 1969 T. L. CROWE 3,433,506
HIGH TEMPERATURE EXTENSION JOINT
Filed Oct. 21, 1966

INVENTOR.
TALMADGE L. CROWE
By Bernard Kriegel
ATTORNEY.

United States Patent Office 3,433,506
Patented Mar. 18, 1969

3,433,506
HIGH TEMPERATURE EXTENSION JOINT
Talmadge L. Crowe, Houston, Tex., assignor to Baker Oil Tools, Inc., City of Commerce, Calif., a corporation of California
Filed Oct. 21, 1966, Ser. No. 588,601
U.S. Cl. 285—187          9 Claims
Int. Cl. F16l 15/02, 55/00

ABSTRACT OF THE DISCLOSURE

An expansion joint useful in well bores, in which an inner member is telescoped in an outer member, a tubular seal member of tetrafluoroethylene, or the like, on the outer member sealingly engaging the inner member. The outer member has longitudinally spaced grooves into which the seal member can expand upon increase in its temperature, subsequent contraction of the seal member upon its cooling causing the seal member to engage tapered sides of the grooves and be forced inwardly thereby against the inner member.

---

The present invention relates to extension joints, and more particularly to extension joints to be incorporated in tubing strings adapted for use in well bores, which are subjected to high temperature operating conditions.

Tubing strings used in well bores are subjected to comparatively high temperatures when steam is pumped through them and into the formation. The tubing string may be subjected to considerable variations in temperature, as, for example, in connection with the flow of steam therethrough for a protracted period, after which the well bore production may pass upwardly through the tubing string at a relatively cold temperature. The steel tubing string will, of course, expand upon elevation of its temperature and contract upon decrease of its temperature, requiring the incorporation of an expansion joint at some point in its length that will permit the expansion and contraction to occur without damage to the tubing string and other equipment in the well bore. Difficulty has been experienced in providing a proper expansion joint that will provide the necessary leakproof seal between the relatively movable parts of the joint when its temperature is relatively low as well as when its temperature is relatively high. In addition, the pressure of the fluids flowing through the tubing string may tend to cause the material of which the seal used in the expansion joint to extrude between its relatively movable parts and create difficulties. The tubing string may also be disposed in a relatively hostile environment in the well bore, since foreign particles could tend to adhere to the working surfaces of the expansion or extension joint and produce failure of the seal between its relatively movable parts.

In the present invention, an inner tubular member is telescoped within an outer tubular member to permit relative longitudinal movement therebetween. An elongate deformable seal member is carried by one of the members and sealingly engages the other member, the one member having axially spaced grooves with tapered sides so that the seal member can expand into the grooves upon increase in its temperature, subsequent decrease in its temperature causing the portions of the seal member in the grooves to contract against the tapered sides and be urged laterally against the other member.

In view of the foregoing, it is an object of the present invention to provide an improved extension joint adapted for incorporation in a tubing string, which will maintain a leakproof seal when subjected to substantial temperature changes.

Another object of the invention is to provide an extension joint particularly adapted for use in a tubing string to be disposed in a well bore, which is capable of maintaining a leakproof seal between the parts of the joint when subjected to low temperatures, as well as when subjected to relatively high temperatures, which may be as high as about 660° F.

A further object of the invention is to provide an extension joint particularly adapted for use in a tubing string to be disposed in a well bore, which will maintain a leakproof seal despite large and repeated variations in the temperatures to which the tubing string and expansion joint are subjected.

An additional object of the invention is to provide an extension joint capable of maintaining a leakproof seal between its relatively movable parts, the parts of the extension joint being movable longitudinally with respect to each other to a considerable extent, a leakproof seal between the parts being retained despite wide variations in the temperature of the parts, while the friction between the parts is kept at a comparatively low value.

Yet a further object of the invention is to provide an extension joint adapted to be incorporated in a tubing string disposed in a well bore, and which will maintain a leakproof seal despite being subjected to elevated temperatures, and in which extrusion of the sealing material between the relatively movable parts of the extension joint under high temperature conditions, high pressure conditions, or a combination of both conditions, is prevented.

An additional object of the invention is to provide an extension joint adapted to be incorporated in a tubing string to be disposed in a well bore, in which the presence of foreign particles, or other foreign materials, against which the sealing material of the extension joint may bear will not result in leaking of the extension joint.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
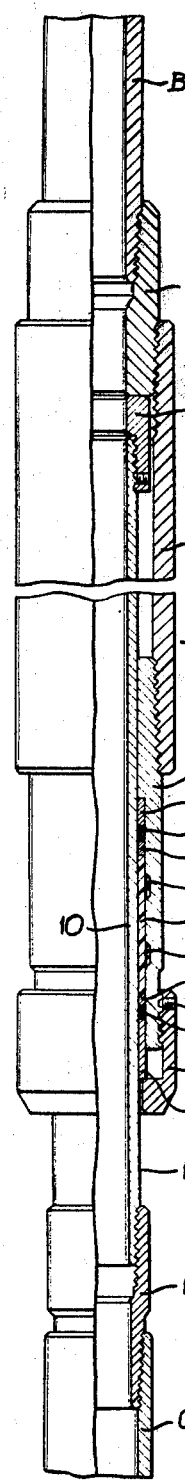
FIGURE 1 is a combined side elevational view and longitudinal section of an extension joint embodying the invention and incorporated in a tubing string adapted to be disposed in a well bore.

The particular apparatus illustrated in the drawings is an expansion joint A adapted to be incorporated in a tubing string B to be disposed in a well bore. The upper end of the expansion joint is connected to the tubing string thereabove that extends to the top of the well bore; whereas, the lower portion of the expansion joint may be connected to a well packer therebelow (not shown) through a lower portion C of the tubing string, which, for example, may be made up of joints having a length of about 40 to 90 feet. The well packer is set in the well casing in a known manner, and high temperature steam, or other fluids, can be pumped downwardly through the tubing string and through the packer into the formation.

The expansion or extension joint includes a mandrel or tubular inner member 10 having a smooth peripheral surface 11, the lower end of which is threadedly secured to a coupling 12, which is, in turn, threadedly attached to a section of tubing C therebelow. The mandrel is telescoped within the seal portion of the apparatus, which includes a seal housing or outer tubular member 13, the upper end of which is threadedly connected to a nipple 14 that has its upper portion threadedly attached to a coupling 15 threadedly secured to a tubing section B thereabove. The mandrel 10 and nipple may each be of an appropriate length, depending upon the length of the entire tubing string B and the expansion and contraction of the tubing string that might be expected as a result of changes in its temperatures. As an example, the nipple and the mandrel may each have a length of 10, 15 or 20 feet. A head 16 is threadedly attached to the upper end of the mandrel, and this head is adapted to abut the lower end of the coupling 15, If desired, the lower end of the coupling and the head may have clutch teeth (not shown) formed thereon adapted to mesh, for the purpose of allowing torque to be transmitted through the extension joint A, which may be required in setting the well packer therebelow against the well casing.

The inside diameter of the seal housing member or outer member 13 is greater than the outside diameter of the mandrel 10, providing an annular space 17 therebetween in which a seal member 18 is disposed. As specifically illustrated, this seal member is in the form of a sleeve that can make a slidable seal against the periphery 11 of the mandrel, and which also will bear against the inner surface 19 of the seal housing member. The upper end of this seal 18 engages an adapter ring 20 having an outer generally V-shaped end 21 bearing against a companion V-shaped end 22 in a back-up ring 23 that bears against a spacer ring 24 abutting a downwardly facing shoulder 25 provided by the seal housing. In a similar fashion, the lower end of the seal member or sleeve 18 bears against an adapter ring 20 that has a lower or outer V-shaped end portion 21 bearing against a V-shaped end portion 22 in a back-up ring 23, the lower end of which engages a spacer or pusher ring or sleeve 24 that extends downwardly beyond the lower end of the seal housing 13, and which bears upon an inwardly directed flange 26 of a seal retainer 27 threadedly and adjustably secured to the seal housing 13. The upper and lower adapter rings 20 and back-up rings 23 make a slidable fit against the periphery 11 of the mandrel, and also snugly fit against the inner wall 19 of the seal housing member. Since these rings will slide relatively along the mandrel or inner member 10, they are preferably made of a good bearing material, such as bronze, in order to reduce the coefficient of friction between them and the mandrel, which is made of steel.

The seal member or sleeve 18 is made of a material which is deformable, that has a low coefficient of friction and antistick properties, which has a much greater coefficient of expansion than steel, and which retains its useful sealing properties at elevated temperatures, as well as at relatively low temperatures. Specifically, the seal member is a fluorocarbon, such as a tetrafluoroethylene polymer, known under the trademark "Teflon" (TFE). This particular material will retain its useful properties at temperatures as high as about 660° F. If the expansion joint will not be subjected to temperatures as high as that indicated, the seal member can be made of another fluorocarbon product, such as a trifluorochloroethylene polymer, sold under the brand name "Kel-F."

Both of the above products have very low coefficient of friction, high temperature stability, and a much greater coefficient of expansion than steel, of which the mandrel 10 and the seal housing 13 are made.

The seal housing member or outer member 13, in its region surrounding the seal member 18, has a plurality of longitudinally spaced inner circumferential grooves or notches 30 formed therein, each of these grooves having its sides 31, 32 tapered. These grooves 30 provide areas into which the sleeve or seal member 18 can expand or flow as its temperature is elevated, because of the fact that its coefficient of expansion and contraction is much greater than that of steel.

Figure 2:
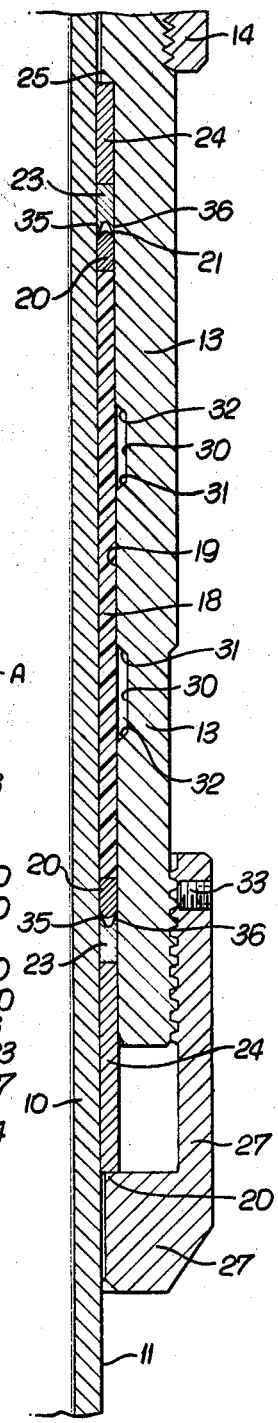
FIG. 2 is a fragmentary longitudinal section of the sealing portion of the extension joint, with the seal member in its initial condition.

Initially, the expansion or extension joint A is assembled with the parts occupying the relative positions illustrated in FIGS. 1 and 2. The seal retainer 27 is threaded on the seal housing to apply compression to the pusher rings or sleeves 24, the upper and lower sets of adapter and back-up rings 20, 23, and the seal member or sleeve 18 itself. As an example, the parts can be made up with a torque of about 500 ft. lbs. applied to the seal retainer 27, after which a set screw 33 is tightened against the housing 13 to prevent further adjustment or movement of the retainer 27 on the seal housing. The compression thus applied to the seal member 18 might cause some of it to move into the grooves or notches 30 to some extent, the endwise compression insuring the firm sealing engagement of the seal member against the periphery 11 of the mandrel, as well as against the inner wall 19 of the seal housing 13. Such endwise compression also exerts an inwardly directed force on the inner lips 35 of the back-up rings 23 and also on their outer lips 36, tending to urge them inwardly against the periphery 11 of the mandrel and outwardly against the inner wall 19 of the seal housing, to present zero clearance between the back-up rings and the mandrel and the housing, and thereby providing no spaces into which the material of the seal member 18 can flow or extrude.

Figure 3:
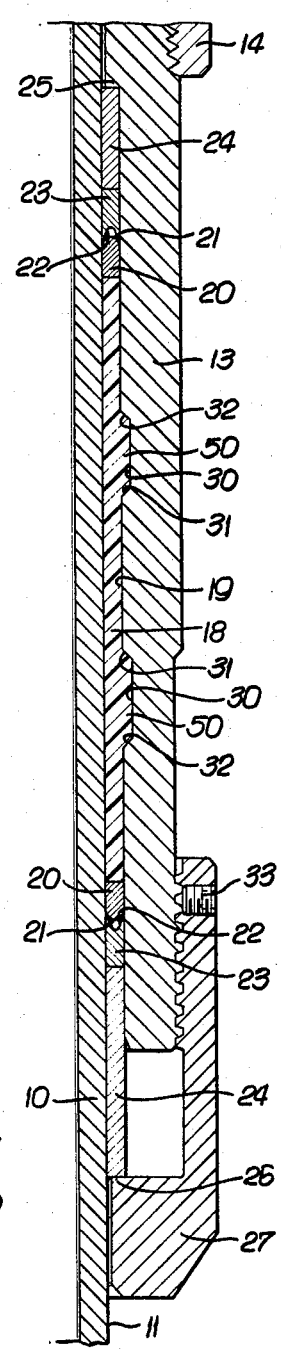
FIG. 3 is a view similar to FIG. 2 illustrating the seal member after the extension joint has been subjected to comparatively high temperatures.

The extension joint A is connected at the appropriate location in the tubing string B, with the well packer (not shown) secured to the tubing string C therebelow. This combination is lowered in a well casing to the desired point at which the well packer is to be set. Following setting of the well packer, the joint A is extended by elevating the tubing string B thereabove, the extension being limited by engagement of the upper end of the seal housing 13 with the lower end of the mandrel head 16. Steam at the required temperature and pressure is pumped down through the tubing string B and the extension joint A, discharging through the well packer and into the well formation. As the temperature of the tubing string and extension joint increases, the tubing string B elongates, the seal housing 13 and the entire seal structure therewithin sliding downwardly along the periphery 11 of the mandrel 10. Since the seal member is made of a material having a much greater coefficient of expansion than the steel mandrel 10 and steel housing 13, it will swell or enlarge in volume as its temperature increases, the sealing material flowing into the grooves or notches 30, assuming the condition disclosed in FIG. 3. The seal member also exerts a longitudinal force against the adapters 20 and the back-up rings 23, forcing the back-up rings inwardly against the inner member or mandrel 10 and outwardly against the wall 19 of the seal member or housing.

The sealing effectiveness of the seal member 18 against the mandrel 10 remains undisturbed, the extrusion of the seal member being prevented by the adapters 20 and the back-up rings 23, which provide no clearance with the mandrel. Despite the high temperature of the parts, they can move relatively longitudinally along the periphery 11 of the mandrel, since the "Teflon" seal member, or the like, has a very low coefficient of friction. Despite a comparatively high sealing force against the periphery of the mandrel, it can slide relatively along its surface. Similarly, the adapters 20 and back-up rings 23, which are made of a good bearing material, such as bronze, will slide relatively along the periphery of the mandrel.

Thus, the sealing effectiveness of the seal member 18 against the periphery 11 of the mandrel is retained, despite the relatively high temperatures and relatively high pressures to which the extension joint might be subjected. As indicated above, the seal member 18 will be effective at temperatures as high as about 660° F., where the seal member is made of "Teflon" (TFE). Where the seal member may not be subjected to temperatures of the order above indicated, but only to the maximum temperatures approaching 400° F., the seal member may, if desired, be made of a trifluorochloroethylene polymer, such as "Kel-F." Because of its retention of its useful properties at much higher temperatures than "Kel-F," it is preferred to use "Teflon" (TFE).

Figure 4:
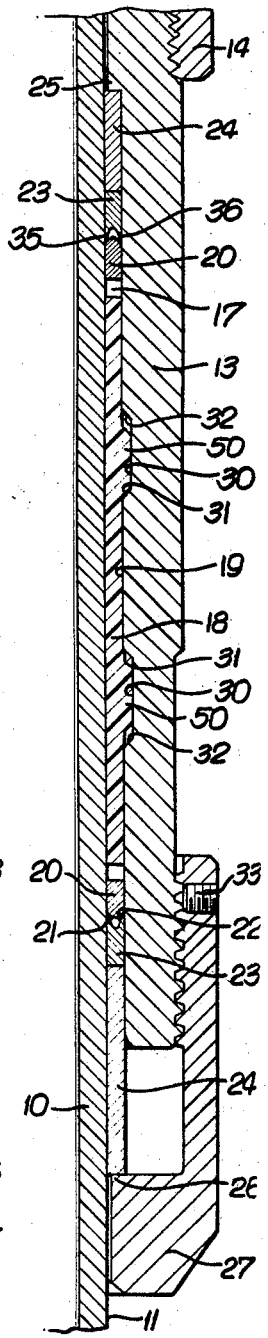
FIG. 4 is a view similar to FIGS. 2 and 3 illustrating the seal member following its contraction as a result of substantial decrease in the elevated temperature to which it has been previously subjected.

In the event that the pumping of steam through the tubing string B, extension joint A and well packer (not shown) is discontinued, and the temperature decreases, the tubing string B will contract. However, the seal housing 13 and the sealing members 20, 23, 18 therewithin will merely slide upwardly along the mandrel 10. The seal member 18 will also contract, and its end portions will actually pull away from the upper and lower adapter rings 20, such as disclosed in FIG. 4. The decrease in the volume of the seal member, as a result of its pronounced decrease in temperature, will cause it to shrink lengthwise within the housing 13, the seal member shortening and its portions 50 that had been deformed into the grooves 30 will shrink toward each other and bear against the sides 31 of the grooves, there being pressure points created where the seal member engages the sides 31 of the grooves to maintain the seal between the housing 13 and the seal member 18 itself. Since these sides 31 of the grooves are tapered, a transverse component of force is produced upon shrinking of the seal member, which tends to urge the seal member inwardly and insure its inward pressure against the periphery 11 of the mandrel, to maintain the seal between the seal member and the mandrel periphery.

In the event that the tubing string B and the expansion joint A are again subjected to the action of fluids at an elevated temperature, the seal member 18 will reexpand, elongating to bring its end portions back into engagement with the adapter rings 20, and its portions 50 within the grooves expanding to the extent at which they can completely fill the grooves 30. The expansion and contraction of the seal ring 18 can occur as often as desired, its sealing effectiveness against the periphery 11 of the mandrel 10 and against the inner wall 19 of the seal housing 13 being maintained at all times.

The seal member 18 is made of a material soft enough to deform around foreign particles that might deposit upon the periphery 11 of the mandrel. Assuming the seal member to move over such particles, it will not be damaged thereby, but will merely flow or deform around them, to encase them, while retaining its sealing effectiveness against the periphery of the mandrel.

I claim:
1. In an expansion joint: an outer tubular member; an inner tubular member movable relatively longitudinally in said outer member; an elongate tubular deformable seal member carried by one of said tubular members and slidably and sealingly engaging said other tubular member; said one of said tubular members having axially spaced circumferential grooves confronting said seal member; said seal member having a coefficient of expansion and contraction substantially greater than said tubular members, whereby said seal member is adapted to deform into said grooves in response to increase in its temperature; wherein the sides of said grooves are tapered to force said seal member toward said other of said members upon decrease in the temperature of said seal member.

2. In an expansion joint as defined in claim 1; wherein end members are carried by said one of said tubular members and against which the ends of said seal member bear.

3. In an expansion joint as defined in claim 1; wherein said seal member is a fluorocarbon resin.

4. In an expansion joint as defined in claim 1; wherein said seal member is a tetrafluoroethylene polymer.

5. In an expansion joint as defined in claim 1; wherein said seal member is a trifluorochloroethylene polymer.

6. In an expansion joint: an outer tubular member; an inner tubular member movable relatively longitudinally in said outer member; said outer member having a portion laterally spaced from the periphery of said inner member to define an annular space therebetween; longitudinally spaced end members in said outer member bridging said annular space; an elongate tubular deformable seal member in said annular space with its end portions engageable with said end members, said seal member sealingly engaging said inner member; said outer tubular member having axially spaced internal circumferential grooves confronting said seal member; said seal member having a coefficient of expansion and contraction substantially greater than said tubular members, whereby said seal member deforms into said grooves in response to increase in its temperature; wherein the sides of said grooves are tapered to force said seal member against said inner member upon decrease in the temperature of said seal member.

7. In an expansion joint as defined in claim 6; wherein said seal member is a fluorocarbon resin.

8. In an expansion joint as defined in claim 6; wherein said seal member is a sleeve of a tetrafluoroethylene polymer.

9. In an expansion joint as defined in claim 6; wherein said seal member is a trifluorochloroethylene polymer.

References Cited
UNITED STATES PATENTS

| | | | |
|---|---|---|---|
| 235,972 | 12/1880 | Stewart | 285—302 |
| 1,671,308 | 5/1928 | Murphy | 285—302 X |
| 3,006,665 | 10/1961 | Harris | 285—302 |
| 3,127,182 | 3/1964 | Wardleigh. | |
| 3,149,845 | 9/1964 | Knox | 277—26 |
| 3,217,805 | 11/1965 | Howard | 285—302 X |

THOMAS F. CALLAGHAN, *Primary Examiner.*

U.S. Cl. X.R.
166—242; 277—26; 285—302, 338